(12) United States Patent
Koba et al.

(10) Patent No.: US 6,831,245 B1
(45) Date of Patent: Dec. 14, 2004

(54) WIRE ELECTRIC DISCHARGE MACHINING DEVICE

(75) Inventors: Ryogo Koba, Tokyo (JP); Akihito Adachi, Tokyo (JP); Makoto Tanaka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/204,986

(22) PCT Filed: Feb. 25, 2000

(86) PCT No.: PCT/JP00/01115
§ 371 (c)(1),
(2), (4) Date: Dec. 9, 2002

(87) PCT Pub. No.: WO01/62423
PCT Pub. Date: Aug. 30, 2001

(51) Int. Cl.[7] .................................. B23H 7/02
(52) U.S. Cl. ........................ 219/69.12; 219/69.14
(58) Field of Search ........................ 219/69.12, 69.14

(56) References Cited

U.S. PATENT DOCUMENTS

| 4,992,640 | A | * | 2/1991 | Tanaka et al. | ............ | 219/69.12 |
| 5,171,955 | A | * | 12/1992 | Hosaka et al. | ............ | 219/69.12 |
| 5,187,342 | A | * | 2/1993 | Aso et al. | ............... | 219/69.14 |
| 5,374,795 | A | * | 12/1994 | Enami | ..................... | 219/69.12 |

FOREIGN PATENT DOCUMENTS

| JP | 4-146025 | A | * | 5/1992 | |
| JP | 5-269626 | | | 10/1993 | |
| JP | 7-96167 | B | * | 10/1995 | |
| WO | WO 9313902 | A1 | * | 7/1993 | ............ B23H/7/02 |

* cited by examiner

*Primary Examiner*—Geoffrey S. Evans
(74) *Attorney, Agent, or Firm*—Sughrue Mion, PLLC

(57) ABSTRACT

A wire electric discharge machining apparatus has a wire guide upper unit for slidably retaining a wire electrode above a subject to be machined, a wire guide lower unit for slidably retaining the wire electrode below the subject, an arm member for retaining the wire guide lower unit in a position opposite to the wire guide upper unit, a machining tank filled with machining solution in which the subject is immersed and having a long hole through which the arm member can pass and move, and a sealing unit for suppressing outflow of the machining solution from the long hole. The sealing unit has a sealing plate for blocking the long hole of the machining tank. The wire electric discharge machining apparatus has machining solution jetting unit for jetting the machining solution into a small gap formed between a peripheral portion of the long hole and the sealing plate.

5 Claims, 8 Drawing Sheets

·······► FLOW OF SLUDGE-CONTAINING MACHINING SOLUTION IN MACHINING TANK

———► FLOW OF MACHINING SOLUTION JETTED

----▶ FLOW OF SLUDGE-CONTAINING MACHINING SOLUTION IN MACHINING TANK
———▶ FLOW OF MACHINING SOLUTION JETTED

WIRE ELECTRIC DISCHARGE MACHINING DEVICE

This application is a 371 of PCT/JP00/01115, filed on Feb. 25, 2000.

TECHNICAL FIELD

The present invention relates to an electric discharge machining apparatus using a wire electrode as a tool for supplying electric discharge energy between the wire electrode and an electrically conductive subject to be machined to machine the subject into a desired shape. Particularly the invention relates to improvement in a sealing unit, which suppresses outflow of a machining solution from a machining tank when the subject is machined while immersed in the machining solution.

BACKGROUND ART

FIG. 8 is a schematic side view showing a conventional wire electric discharge machining apparatus. In the drawing, the reference numeral 1 designates a machining tank disposed on an X-Y cross table of an apparatus body not shown. A table 3 is disposed in the inside of the machining tank 1. The machining tank 1 is set in a state in which a subject 6 to be machined is immersed in a machining solution 7. Reference numeral 10 designates an upper wire guide device. A wire guide, which supports a wire electrode 11 so that the wire electrode 11 can slide freely, is provided in the inside of the upper wire guide device 10. The upper wire guide device 10 is retained above the subject 6 by a Z axis 13 which moves up and down in the drawing. Reference numeral 15 designates a lower wire guide device. A wire guide, which supports the wire electrode 11 so that the wire electrode 11 can slide freely, is provided in the inside of the lower wire guide device 15. The lower wire guide device 15 is retained in a position below the subject 6 and opposite to the upper wire guide device 10 by a lower arm 17. Reference numeral 20 designates a long hole which is provided in a side surface of the machining tank 1 and which is long in a front-and-rear direction of the paper plane of the drawing. The lower arm 17 passes through the long hole 20. The long hole 20 has an opening size which allows the X-Y cross table to move. Reference numeral 24 designates a sealing unit, which is disposed so as to cover the long hole 20 formed in the machining tank 1. The sealing unit 24 has: a base 23 fixed to the machining tank 1 and having a long hole 23h like the long hole 20 of the machining tank 1; a sealing plate 25 defining hole 25$h$ allowing the lower arm 17 to pass therethrough and having a length sufficient to cover the machining tank 1 and the long hole 23$h$ of the base 23; and a first packing 26 attached to the base 23 in order to minimize leakage of the machining solution 7 from between the base 23 and the sealing plate 25. Reference numeral 27 designates a roller retaining mechanism. The roller retaining mechanism 27 has a shaft 28, and a bearing 29. The roller retaining mechanism 27 is formed so that the bearing 29 can rotate freely relative to the shaft 28. The roller retaining mechanism 27 is fixed to the base 23 so that the sealing plate 25 is retained so as to be movable in a front-and-rear direction of the paper plane of the drawing. Reference numeral 30 designates a second packing which is fixed to the sealing plate 25 in order to prevent the machining solution 7 from leaking from a gap between an outer circumferential portion of the lower arm 17 and the through-hole 25$h$ of the sealing plate 25.

An operation of the conventional apparatus configured as described above will be described below. At the time of machining, while a voltage supplied from a power supply not shown is applied between the wire electrode 11 and the subject 6 to generate electric discharge therebetween, the subject 6 is moved with respect to the wire electrode 11 by the X-Y cross table not shown to machine the subject 6. On this occasion, the subject 6 is entirely immersed in the machining solution 7 an upper surface thereof, stability of electric discharge is obtained so that the wire electrode 11 becomes hard to break. Therefore, the machining solution 7 is stored in the machining tank 1. In this case, leakage of the machining solution 7 from the long holes 20 and 23$h$, which are formed in the machining tank 1 and the base 23, respectively and are pierced by the lower arm 17 is suppressed by entirely covering with the sealing plate 25. That is, when the X-Y cross table moves, the three of the machining tank 1, the base 23 and the first packing 26 move relative to the sealing plate 25. When the machining tank 1 moves in a horizontal direction (in the front-and-rear direction of the paper plane of FIG. 8) with respect to the lower arm 17, the distance between the sealing plate 25 and the base 23 is kept constant by the roller retaining mechanism 27 so that the sealing plate 25 and the base 23 are retained in positions where they always come into contact with the first packing 26. In this state, while the sealing plate 25 and the first packing 26 slide on each other, the machining tank 1 moves in the horizontal direction. On the other hand, when the machining tank 1 moves in an axial direction (in a left-and-right direction of the paper plane of FIG. 8) of the lower arm 17, the machining tank 1 moves while the lower arm 17 and the second packing 30 slide on each other. Hence, leakage of the machining solution 7 from the gap between the base 23 and the sealing plate 25 is suppressed by the first packing 26. Further, leakage of the machining solution 7 from the gap between the outer circumferential portion of the lower arm 17 and the through-hole 25h of the sealing plate 25 is suppressed by the second packing 30.

Since the conventional sealing unit in the electric discharge machining apparatus is configured as described above, the machining solution 7 in the machining tank 1 is contaminated with foreign matter such as sludge at the time of machining. If such a state continues for a long time, the foreign matter is stuck and deposited on the machining tank 1 side surface of the sealing plate 25. For this reason, the coefficient of friction between the first packing 26 and the sealing plate 25 increases, and the resistance to sliding of the sealing plate 25 also increases. When the resistance to sliding of the sealing plate 25 increases, load imposed on the lower arm 17 increases. As a result, the lower arm 17 is deformed to reduce machining accuracy as shown in FIG. 9, which is a plan typical view slightly exaggerated.

Moreover, when the foreign matter such as sludge increases, a gap is produced between the first packing 26 and the sealing plate 25. As a result, the quantity of leakage of the machining solution 7 increases. Hence, there may arise a problem that the machining solution 7 cannot be stored in the machining tank 1.

DISCLOSURE OF THE INVENTION

The present invention is designed to solve the aforementioned problems in the background art and an object of the invention is to provide a wire electric discharge machining apparatus in which foreign matter such as sludge produced at a time of machining is not deposited on a surface of a sealing plate and the foreign matter can be removed even if the foreign matter is deposed on the surface of the sealing plate.

In the wire electric discharge machining apparatus according to the invention, a sealing unit is constituted by a sealing plate and a packing, the sealing plate for blocking long hole of a machining tank, a groove is formed along an outer periphery of the long hole, and nozzles are provided for jetting the machining solution into the groove, and a machining solution jetting unit is provided for jetting the machining solution from the nozzles into a small gap formed between a peripheral portion of the long hole and the sealing plate. Further, in the wire electric discharge machining apparatus according to the invention, a plurality of the nozzles are provided and apertures of low-pressure nozzles are made larger than those of high-pressure nozzles. Further, the wire electric discharge machining apparatus according to the invention further has a controller for discriminating between at least two machining states of rough machining and final machining, and a unit for changing the flow rate of the machining solution jetting by the machining solution jetting unit by using a plurality of circuits different in flow rate of the machining solution fed, wherein the flow rate of the machining solution jetted is controlled to be small at a time of rough machining and large at a time of final machining. Further, in the wire electric discharge machining apparatus according to the invention, a filtration unit for the machining solution jetted from the machining solution jetting unit is provided in the circuit of the machining solution.

MODE FOR CARRYING OUT THE INVENTION

Embodiment 1

Figure 1:
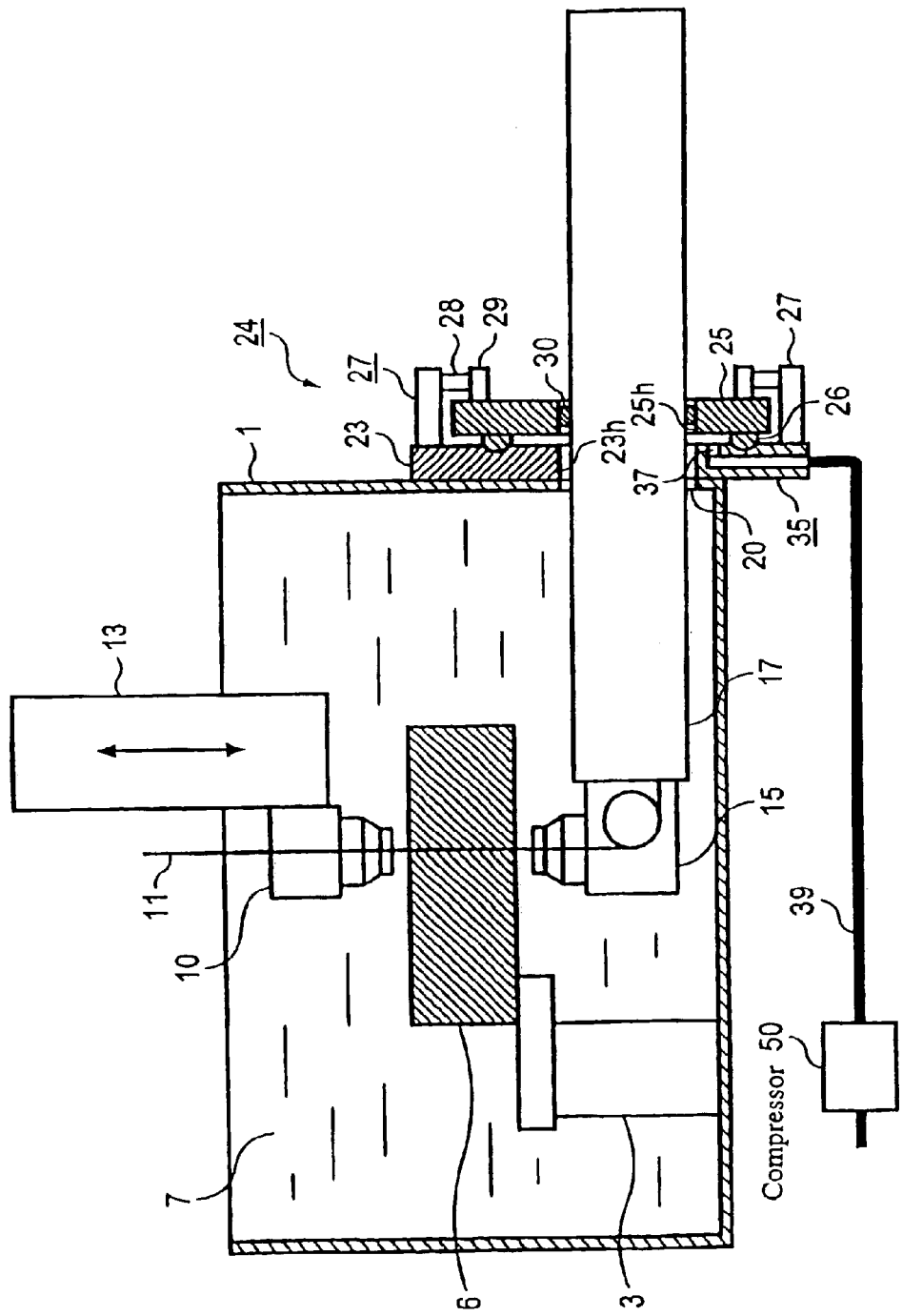
FIG. 1 is a schematic side view showing a machining tank portion of a wire electric discharge machining apparatus according to an embodiment of the invention.
Figure 8:
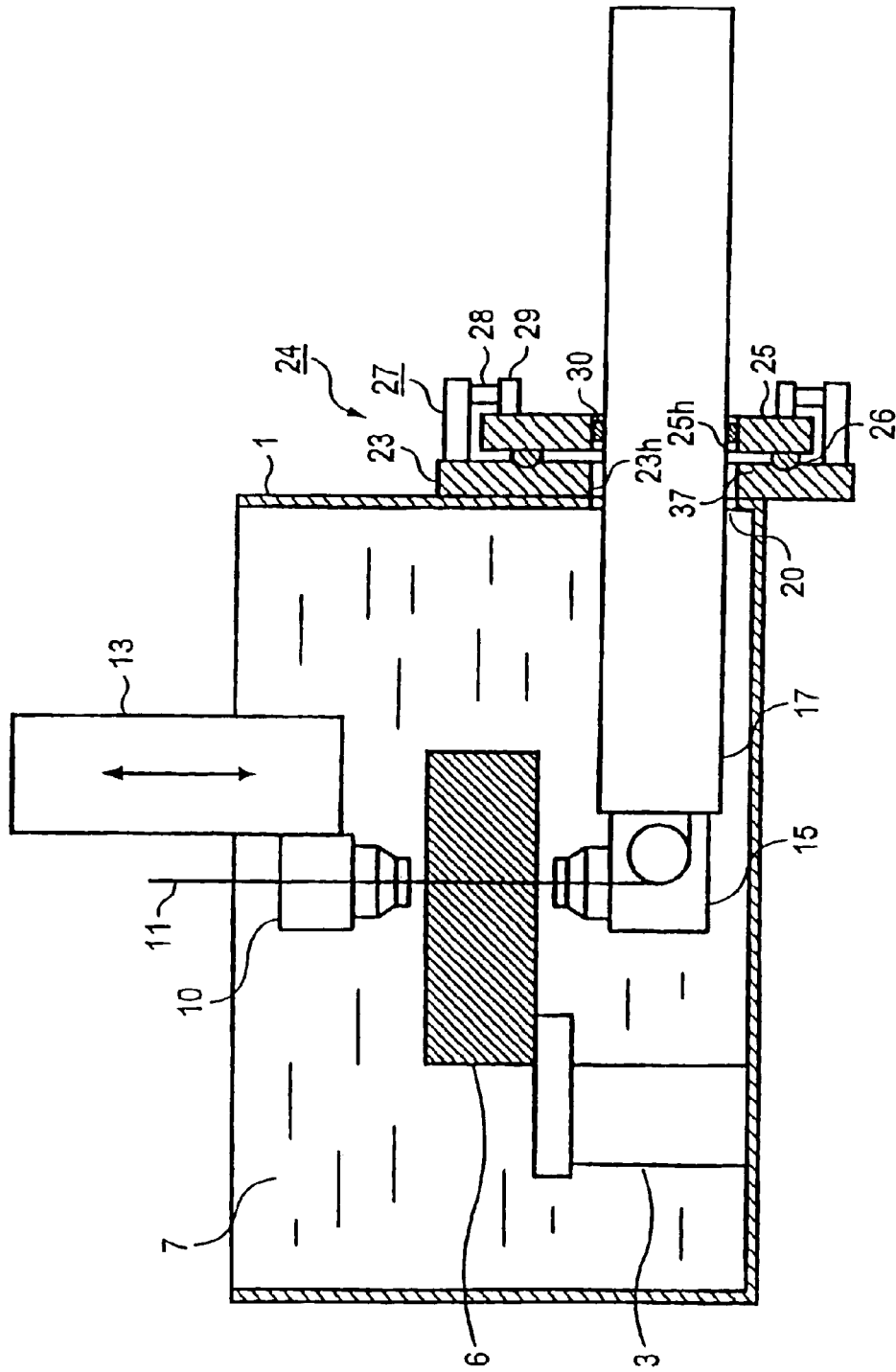
FIG. 8 is a schematic side view showing a machining tank portion of a conventional wire electric discharge machining apparatus.
Figure 9:
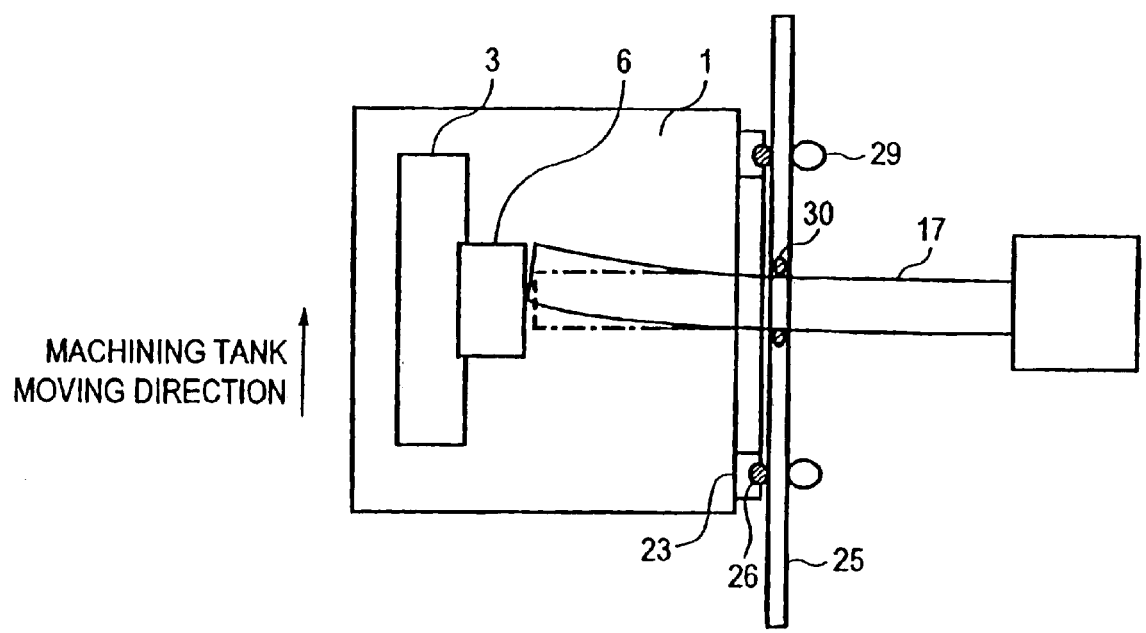
FIG. 9 is a schematic plan typical view for explaining the situation of deterioration of accuracy in the conventional wire electric discharge machining apparatus.

Embodiments of the invention will be described below with reference to the drawings. FIG. 1 is a schematic side view showing a machining tank portion of a wire electric discharge machining apparatus. In FIG. 1, reference numeral 35 designates a machining solution jetting unit which is formed in a base 23, has a predetermined number of machining solution nozzles 37 opened toward a sealing plate 25 and is connected to a machining solution compressor 50 such as a pump by piping 39. Incidentally, other parts are the same as those in the conventional apparatus explained with reference to FIG. 8, so that description thereof will be omitted.

An operation of the apparatus according to this embodiment will be described below. Parts concerning wire electric discharge machining are the same as those in the conventional example, so that description thereof will be omitted. Hence, description will be made about removal of foreign matter (hereinafter referred to as "sludge") such as sludge deposited on the sealing plate 25. As machining starts, a subject 6 to be machined is machined while sludge is produced. Sludge in the machining solution 7 in the machining tank 1 increases gradually, so that the sludge is deposited on the sealing plate 25. At the same time, however, a clean machining solution 7, for example, obtained by filtration of the machining solution 7 is fed to the machining solution jetting unit 35 formed in the base 23 via the piping 39 by the machining solution compressor 50. The fed clean machining solution 7 is jetted from the machining solution nozzles 37 toward the sealing plate 25. The clean machining solution 7 jetted collides with the sealing plate 25 to thereby remove the sludge deposited on the sealing plate 25. When the clean machining solution 7 is further continuously jetted from the machining solution nozzles 37, the machining solution 7 jetted forms a machining solution flow path in which the machining solution 7 passes through a gap between the long hole 23h formed in the base 23 and the outer circumferential portion of the lower arm 17 and a gap between the long hole 20 of the machining tank 1 and the outer circumferential portion of the lower arm 17, along a surface of the sealing plate 25 and returns into the machining tank 1. As a result, the sludge-containing machining solution 7 in the machining tank 1 does not flow toward the sealing plate 25 any more, so that the sludge can be prevented from being deposited on the sealing plate 25.

Incidentally, the rate of the machining solution 7 in the machining tank 1 is controlled by a machining solution quantity controller not shown.

Figure 2:
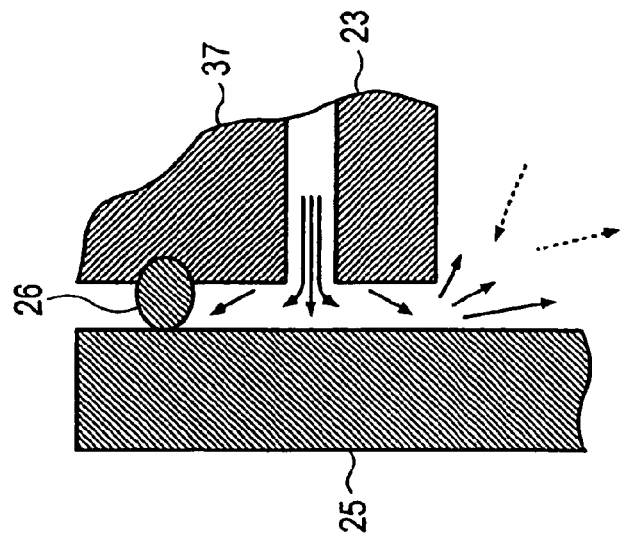
FIGS. 2(a) and (b) are explanatory views obtained from an experiment, showing the action of a machining solution in the apparatus depicted in FIG. 1.
Figure 2:
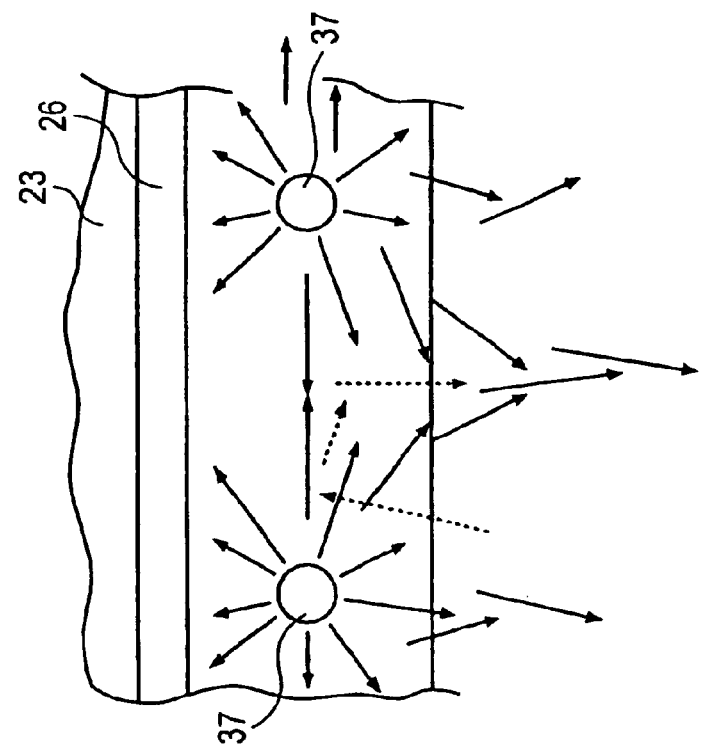

An action of the machining solution 7 jetted from the machining solution nozzles 37 will be further described with reference to FIG. 2 obtained from a result of an inventor's experiment.

That is, FIG. 2(a) is a view showing a flow of the machining solution 7 viewed from a direction opposite to the machining solution nozzles 37 in a state in which the sealing plate is removed, and FIG. 2(b) is a view of FIG. 2(a) viewed from a side direction. It is obvious from these drawings that the machining solution 7 jetted from the machining solution nozzles 37 flows in the gap formed between the base 23 and the sealing plate 25 as represented by the solid line in the drawings, passes through the gap between the long hole 23h of the base 23 and the lower arm 17 and the gap between the long hole 20 of the machining tank 1 and the lower arm 17 and flows into the machining tank 1. Accordingly, the sludge-containing machining solution 7 in the machining tank 1 does not flow toward the sealing plate 25 any more as represented by the broken line in the drawings, so that the sludge-containing machining solution 7 does not approach the packing 26 but flows into the machining tank 1 along the flow of the machining solution 7.

Figure 3:
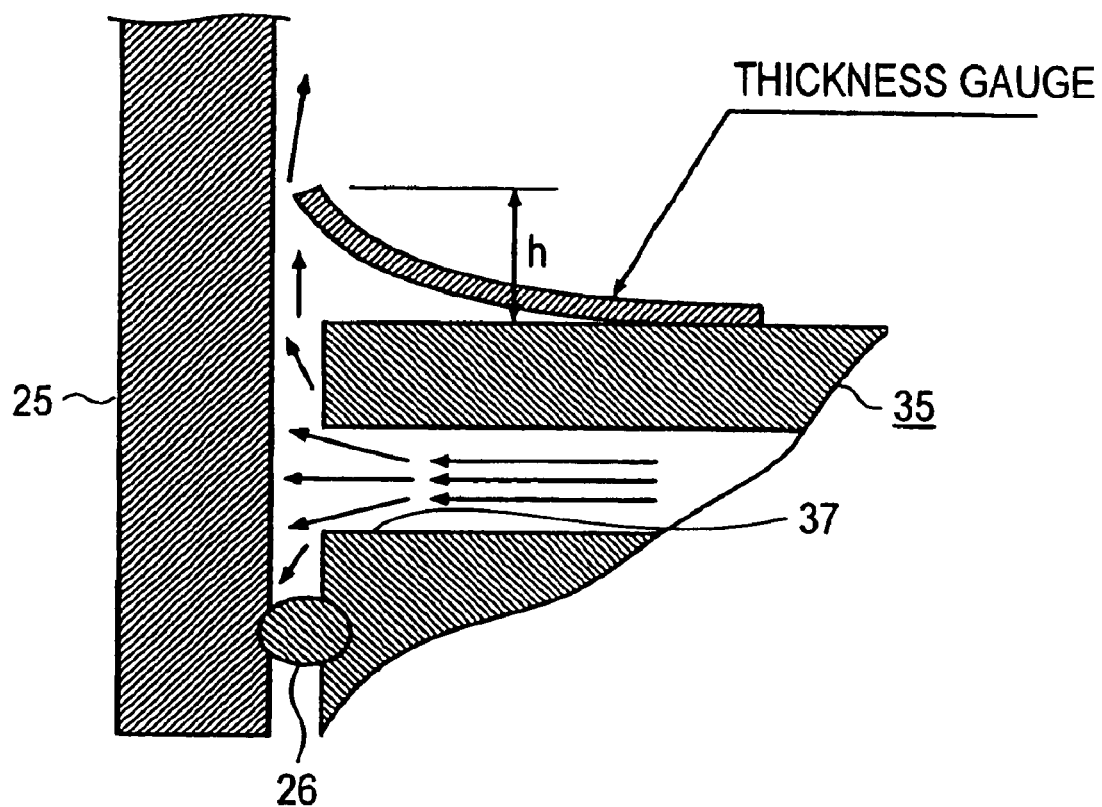
FIG. 3 is an experimental explanatory view for explaining the jetting pressure of the machining solution in the apparatus depicted in FIG. 1.

According to a result of the inventor's experiment shown in FIG. 3, it is obvious that the jetting pressure of the machining solution 7 measured on the basis of the degree of bending of a thickness gauge is several $g/mm^2$ when the gap between the base 23 and the sealing plate 25 is set to be in a range of from 1 to 2 mm and the total jetting rate of the machining solution 7 is set to be tens of liters/min. It becomes also clear that sludge in the machining solution 7 is not deposited on an upper portion of the lower packing 26 in FIG. 1.

Incidentally, the machining solution 7 jetted from the machining solution nozzles 37 is not limited to the case where a solution obtained by filtration of the machining solution 7 used for electric discharge machining is used in the same manner as in the aforementioned embodiment. A clean machining solution which is not used for machining may be fed from the machining solution compressor 50 not shown.

As described above, the machining solution jetting unit 35 restraints sludge from being deposited on the machining tank 1 side surface if the sealing plate 25.

Embodiment 2

Figure 4:
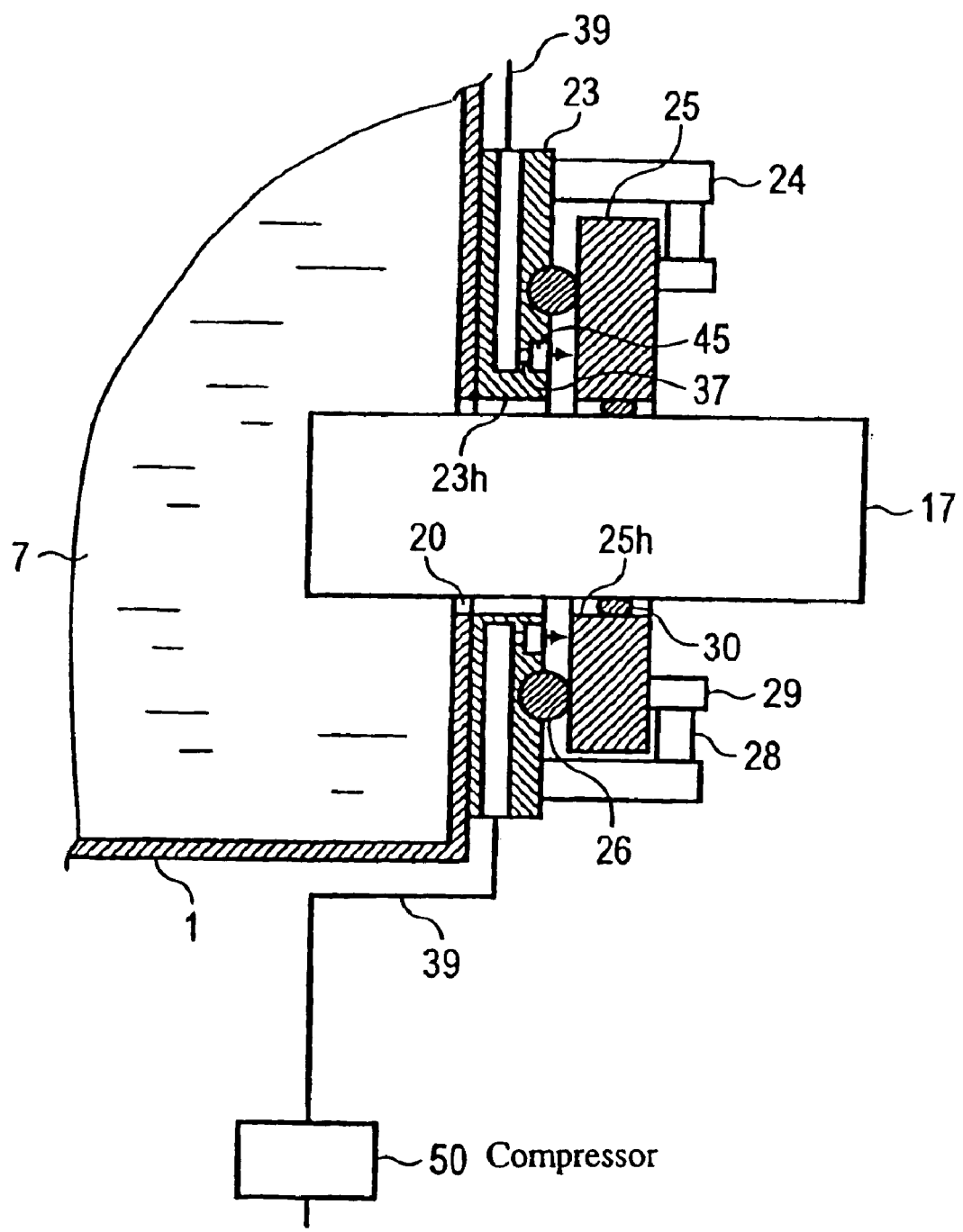
FIG. 4 is a detailed sectional side view showing the machining tank sealing structure of a wire electric discharge machining apparatus according to another embodiment of the invention.

FIG. 4 is a detailed partly sectional side view of a machining solution jetting unit showing another embodiment of the invention. In the drawing, reference numeral 45 designates a machining solution jetting groove. The machining solution jetting groove 45 is formed along the outer circumference of the long hole 23h formed in the base 23 and is connected to the machining solution nozzles 37. Incidentally, other parts of the configuration are the same as those in Embodiment 1 and description thereof will be omitted.

Figure 5:
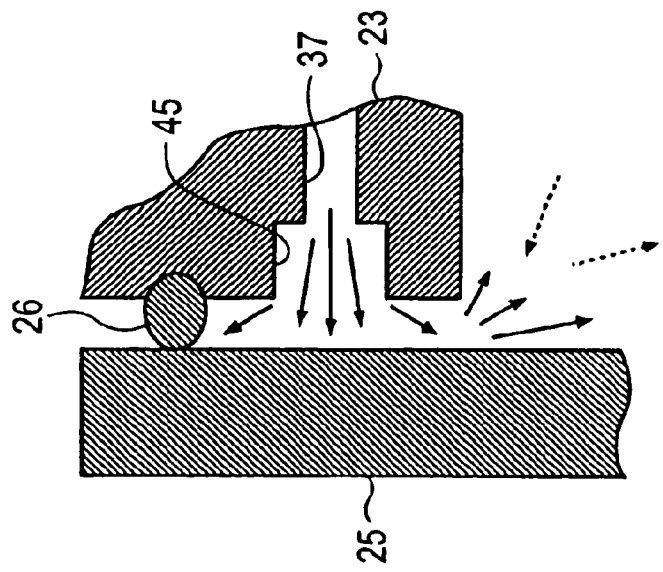
FIGS. 5(a) and (b) are explanatory views obtained from an experiment, showing the action of the machining solution in the apparatus depicted in FIG. 4.
Figure 5:
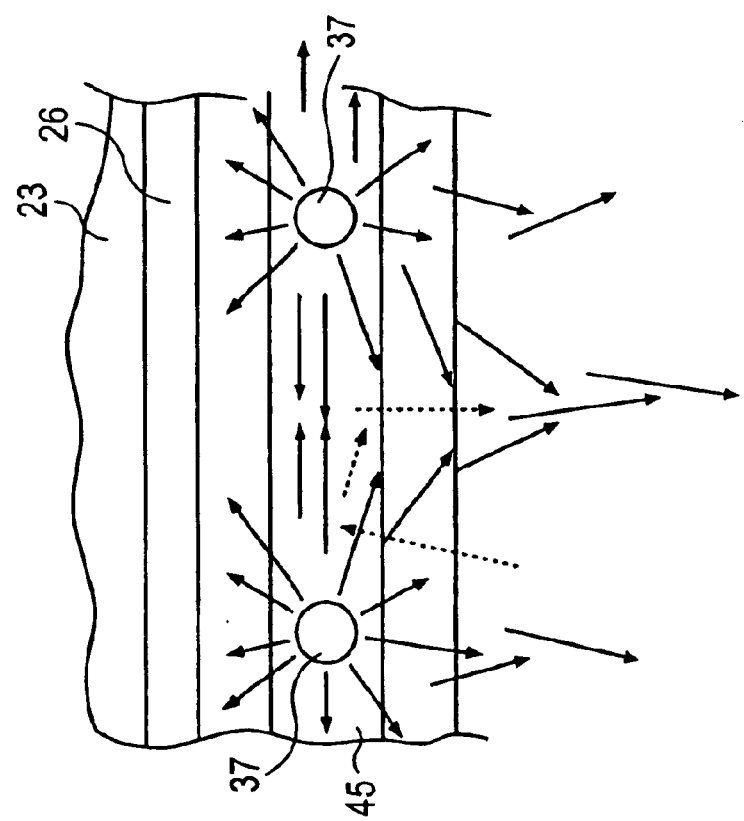

An operation of the apparatus according to this embodiment will be described below with reference to FIG. 5 obtained from a result of an inventor's experiment.

That is, FIG. 5(a) is a view showing a flow of the machining solution 7 viewed from a direction opposite to the machining solution nozzles 37 in a state in which the sealing plate 25 is removed, and FIG. 5(b) is a view of FIG. 5(a) viewed from a side direction. It is obvious from these drawings that the machining solution 7 jetted from the machining solution nozzles 37 flows as represented by solid lines. A part of the machining solution 7 flows in the machining solution jetting groove 45 formed along the outer circumference of the long hole 23h formed in the base 23, so that the part of the machining solution 7 flows over the machining solution jetting groove 45 at the place where flows of the machining solution 7 flowing in the machining solution jetting groove 45 collide with each other. The overflowed machining solution 7 removes not only sludge deposited on a portion of the sealing plate 25 opposite to the machining solution nozzles 37 but also sludge deposited on the sealing plate 25 in a wide range opposite to the machining solution jetting groove 45. Since it is a matter of course that machining is attended with movement of the machining tank 1, the sealing plate 25 moves with respect to the machining solution nozzles 37 or to the machining solution jetting groove 45, so that each of the machining solution nozzles 37 or the machining solution jetting groove 45 is always opposed to a different portion of the sealing plate 25.

According to the machining solution jetting groove 45 and the machining solution nozzles 37 for jetting the machining solution 7 into the machining solution jetting groove 45 in the apparatus according to this embodiment, since the machining solution jetting groove 45 is provided along the outer circumference of the long hole 23h of the base 23, feed of the machining solution 7 to the surface of the sealing plate 25 can be optimized to restrain sludge from being deposited on the machining tank 1 side surface of the sealing plate 25.

Incidentally, as described in Embodiment 1, according to a result of the inventor's experiment as in FIG. 3, the jetting pressure of the machining solution 7 measured on the basis of the degree of bending of a thickness gauge is about several g/mm$^2$ when the gap between the base 23 and the sealing plate 25 is set to be in a range of from 1 to 2 mm and the total jetting rate of the machining solution 7 is set to be tens of liters/min. Hence, it becomes clear that sludge in the machining solution 7 is not deposited on the upper portion of the lower packing 26 in FIG. 4.

Embodiment 3

Figure 6:
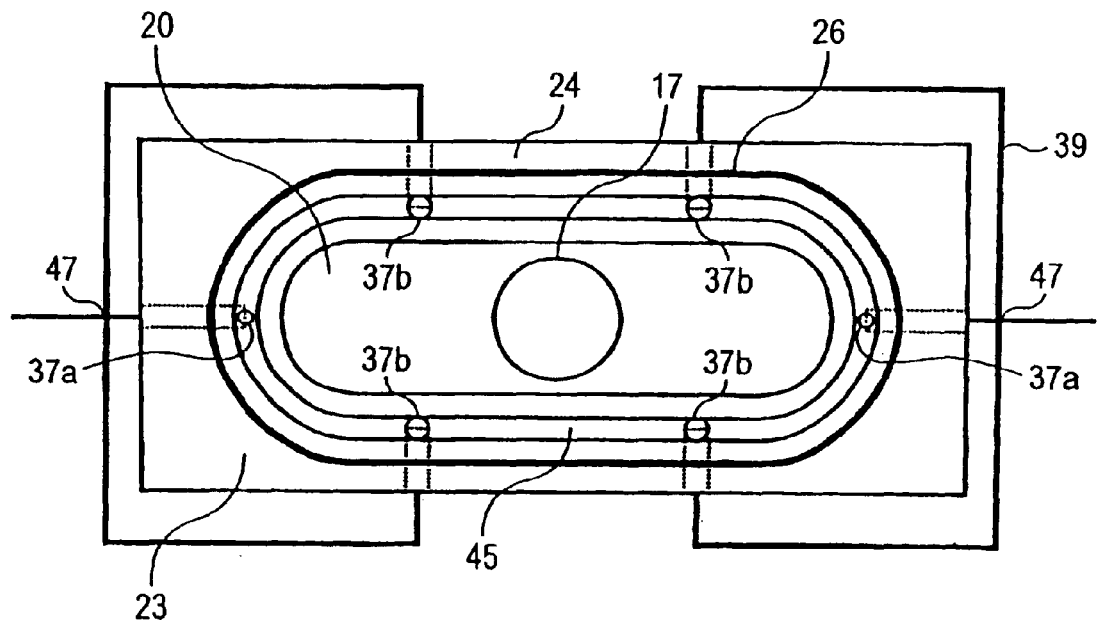
FIG. 6 is a schematic view showing the machining tank sealing structure of a wire electric discharge machining apparatus according to a further embodiment of the invention.

FIG. 6 is a view of a machining solution nozzle 37 portion of the base 23 viewed from a direction opposite to the nozzles 37 and showing a further embodiment of the invention. In the drawing, reference numeral 37a designates a machining solution nozzle with a small aperture, and reference numeral 37b designates a machining solution nozzle with a large aperture. The respective nozzles 37a and 37b are formed in the base 23 so as to be opposite to the sealing plate 25. Further, the machining solution nozzles 37a are formed at places near a machining solution feed port 47 whereas the machining solution nozzles 37b are formed at places far from the machining solution feed port 47. Other parts of the configuration are the same as those in Embodiment 1 or 2 and description thereof will be omitted.

The wire electric discharge machining apparatus according to Embodiment 3 is configured as described above. An operation of the apparatus according to this embodiment will be described below.

The pressure of the machining solution 7 jetted from the machining solution nozzles 37a at places near the machining solution feed port 47 of the machining solution 7 is high. As the place becomes farther from the machining solution feed port 47, the pressure of the machining solution 7 decreases because of pressure loss. The apertures of the machining solution nozzles 37a are narrowed to restrain the rate of the machining solution jetted toward the sealing plate in spite of the high pressure of the machining solution 7 to thereby ensure the rate of the machining solution jetted from the other nozzles. On the other hand, the apertures of the machining solution nozzles 37b at the places far from the machining solution feed port 47 are widened to ensure the rate of the machining solution jetted in spite of the low pressure of the machining solution 7 to thereby blow out a sufficient quantity of the machining solution toward the sealing plate 25.

Embodiment 4

Figure 7:
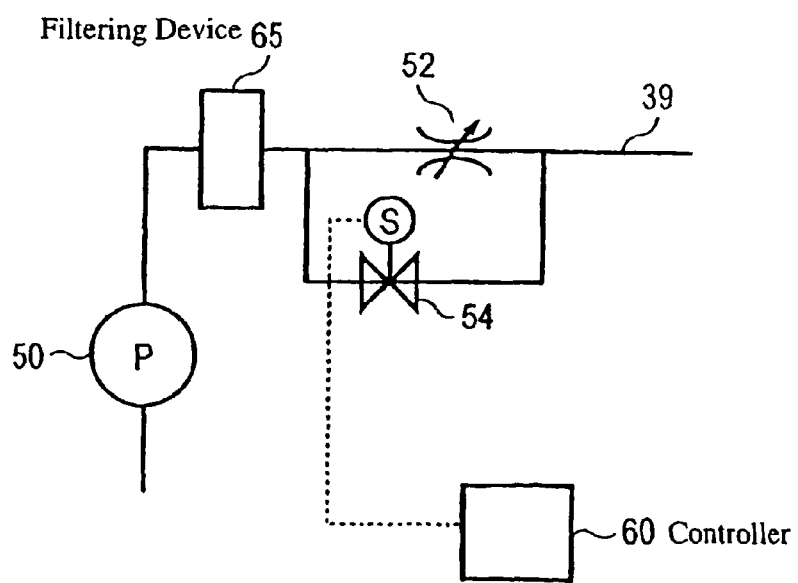
FIG. 7 is a diagram showing a machining solution feed circuit in a wire electric discharge machining apparatus according to a further embodiment of the invention.

FIG. 7 shows a machining solution feed circuit for explaining a further embodiment of the invention. The reference numeral 50 designates a machining solution compressor such as a pump, which is disposed in a machining solution feed device of a machining apparatus body not shown or in another machining solution tank. Reference numeral 52 designates a throttle valve, which is provided at a desired place in the piping 39 in order to limit the rate of the solution jetted from the piping 39. Reference numeral 54 designates an electromagnetic valve, which is disposed at a desired place of the piping for bypassing the throttle valve 52 and is formed so as to be able to be opened/shut on the basis of a signal of a controller 60. Incidentally, the controller 60 identifies the state of machining, e.g. the state of rough machining, the state of final machining, and the state of non-machining. Reference numeral 65 designates a filtering device. Here, the filtering device 65 is provided between the machining solution compressor 50 such as a pump and the throttle valve 52. It is a matter of course that the filtering device 65 may be provided on the upstream side of the machining solution compressor 50 such as a pump or in another circulating circuit.

An operation of the apparatus according to this embodiment will be described below. The controller 60 detects the state of machining, e.g. the controller 60 identifies the state of rough machining, the state of final machining, the state of non-machining, etc.

Normally, at the time of rough machining, since it is necessary to increase feed of the machining solution to a target portion to be machined, the machining solution with a high pressure is generally fed to the target portion. When the machining solution 7 used for electric discharge machining and the machining solution 7 jetted toward a portion of the sealing plate 25 are fed from one and the same machining solution tank, a problem such as shortage of the quantity of the solution in the machining solution tank arises if the rate of the machining solution fed to the portion of the sealing plate 25 increases. On the other hand, at the time of final machining after the rough machining, the required rate of the machining solution fed to the target portion may be small. Even in the case where the rate of the machining solution fed to the sealing plate 25 increases, shortage of the quantity of the solution in the machining solution tank does not occur.

At the time of rough machining, it is a matter of course that a large amount of foreign matter such as sludge is produced, but the foreign matter is hardly deposited on the gap portion between the base 23 and the sealing plate 25 since a convection current of the machining solution in the machining tank 1 is strong due to the high-pressure machining solution 7 fed to the target portion. At the time of final machining, however, foreign matter is apt to be deposited on the gap portion between the base 23 and the sealing plate 25, since the foreign matter such as sludge produced at the time of rough machining remains in the machining tank 1 and the convection current in the machining tank 1 is weak.

Therefore, at the time of rough machining, a predetermined rate of the machining solution 7, e.g. about tens of liters/min of the machining solution 7, is jetted toward the sealing plate 25 from the throttle valve 52 side circuit via the piping 39 in the condition that the electromagnetic valve 54 is closed. At the time of final machining, the electromagnetic valve 54 is opened on the basis of a signal output from the controller 60. Hence, the machining solution 7 flows in the electromagnetic valve 54 side bypass circuit as well as in the throttle valve 52 side circuit. As a result, a large rate of the machining solution 7, e.g. a larger rate of the machining solution 7 than that at the time of rough machining is jetted toward the sealing plate 25 via the piping 39.

The plurality of circuits different in the rate of the machining solution in the apparatus according to this embodiment improve the effect of removing foreign matter such as sludge on the machining tank side surface of the sealing plate 25.

In addition, the filtering device 65 shown in FIG. 4 removes foreign matter such as sludge in the machining solution jetted. As a result, the machining solution fed to the sealing plate 25 is clean and, conversely, foreign matter such as sludge is prevented from being fed to the sealing plate 25.

As described above, in accordance with the invention, the sealing unit is constituted by a sealing plate and a packing, the sealing plate for blocking the long hole of the machining tank, a groove is formed along an outer periphery of the long hole, and nozzles are provided for jetting the machining solution into the groove, and a machining solution jetting unit is provided for jetting the machining solution from the nozzles into a small gap formed between a peripheral portion of the long hole and the sealing plate.

Hence, feed of the machining solution to the surface of the sealing plate can be optimized. As a result, there is an effect of restraining foreign matter such as sludge from being deposited on the machining tank side surface of the sealing plate and there is an effect of preventing deterioration of machining accuracy because increase in resistance to sliding due to the influence of foreign matter can be suppressed.

Further, according to the invention, a plurality of nozzles are provided and apertures of low-pressure nozzles are made larger than those of high-pressure nozzles. Hence, even if there is a difference in feed pressure, feed of the machining solution to the surface of the sealing plate can be divided into optimal distributed amounts. As a result, there is an effect of restraining foreign matter such as sludge from being deposited on the machining tank side surface of the sealing plate and there is an effect of preventing deterioration of machining accuracy because increase in resistance to sliding due to the influence of foreign matter can be suppressed.

Further, according to the invention, the apparatus has a controller for discriminating between at least two machining states of rough machining and final machining and a unit for changing the flow rate of the machining solution jetted by the machining solution jetting unit by using a plurality of circuits different in feed rate of the machining solution, wherein the flow rate of the machining solution jetted is controlled to be small at a time of rough machining and large at a time of final machining. Hence, the rate of the machining solution fed to the sealing plate can be optimized in accordance with the state of machining and in accordance with the capacity of the machining solution feed device in the apparatus body. As a result, there is an effect of improving the efficiency of removal of foreign matter such as sludge on the machining tank side surface of the sealing plate.

Further, according to the invention, filtration unit for the machining solution jetting form the machining solution jetting unit is provided in the circuit of the machining solution. Hence, the rate of the machining solution fed to the sealing plate can be optimized in accordance with the state of machining and in accordance with the capacity of the machining solution feed device in the apparatus body and a clean machining solution can be fed to the surface of the sealing plate. As a result, there is an effect of improving the efficiency of removal of foreign matter such as sludge on the machining tank side surface of the sealing plate by restraining foreign matter such as sludge from being deposited on the machining tank side surface of the sealing plate.

Industrial Applicability

As described above, the wire electric discharge machining apparatus according to the invention is suitable for preventing deterioration of accuracy caused by sticking and deposition of sludge or the like produced by machining.

What is claimed is:

1. A wire electric discharge machining apparatus comprising:

a wire guide upper unit for slidably retaining a wire electrode above a subject to be machined;

a wire guide lower unit for slidably retaining the wire electrode below the subject;

an arm member for retaining the wire guide lower unit in a position opposite to the wire guide upper unit;

a machining tank filled with a machining solution in which the subject is immersed and defining a long hole through which the arm member can pass and move; and a sealing unit, fixed to an outside surface of the machining tank, for suppressing outflow of the machining solution from the long hole formed in the machining tank, wherein the sealing unit is constituted by a base, having a hole corresponding to the long hole, a sealing plate and a packing, the sealing plate for blocking the long hole of the machining tank;

wherein a groove is formed along an outer periphery of the hole of the base;

wherein the wire electric discharge machining apparatus further comprises a machining solution jetting unit having nozzles for jetting the machining solution into the groove, the machine solution jetting unit for jetting the machining solution into a small gap formed between a peripheral portion of the long hole and the sealing plate.

2. The wire electric discharge machining apparatus according to claim 1, wherein openings of the nozzles are disposed in an inner surface of the groove.

3. A wire electric discharge machining apparatus comprising:

a wire guide upper unit for slidably retaining a wire electrode above a subject to be machined;

a wire guide lower unit for slidably retaining the wire electrode below the subject;

an arm member for retaining the wire guide lower unit in a position opposite to the wire guide upper unit;

a machining tank filled with a machining solution in which the subject is immersed and defining a long hole through which the arm member can pass and move; and a sealing unit for suppressing outflow of the machining solution from the long hole formed in the machining tank, wherein the sealing unit is constituted by a sealing plate and a packing, the sealing plate for blocking the long hole of the machining tank;

wherein a groove is formed along an outer periphery of the long hole;

wherein the wire electric discharge machining apparatus further comprises a machining solution jetting unit having nozzles for jetting the machining solution into the groove, the machine solution jetting unit for jetting the machining solution into a small gap formed between a peripheral portion of the long hole and the sealing plate, wherein a plurality of nozzles are provided; and wherein apertures of low-pressure nozzles are made larger than those of high-pressure nozzles.

4. A wire electric discharge machining apparatus comprising:

a wire guide upper unit for slidably retaining a wire electrode above a subject to be machined;

a wire guide lower unit for slidably retaining the wire electrode below the subject;

an arm member for retaining the wire guide lower unit in a position opposite to the wire guide upper unit;

a machining tank filled with a machining solution in which the subject is immersed and defining a long hole through which the arm member can pass and move; and a sealing unit for suppressing outflow of the machining solution from the long hole formed in the machining tank, wherein the sealing unit is constituted by a sealing plate and a packing, the sealing plate for blocking the long hole of the machining tank;

wherein a groove is formed along an outer periphery of the long hole;

wherein the wire electric discharge machining apparatus further comprises a machining solution jetting unit having nozzles for jetting the machining solution into the groove, the machine solution jetting unit for jetting the machining solution into a small gap formed between a peripheral portion of the long hole and the sealing plate, and further comprising:

a controller for discriminating between at least two machining states of rough machining and final machining;

a unit for changing the flow rate of the machining solution jetted by the machining solution jetting unit by using a plurality of circuits different in feed rate of the machining solution, wherein the flow rate of the machining solution jetted is controlled to be small at a time of rough machining and large at a time of final machining.

5. A wire electric discharge machining apparatus comprising:

a wire guide upper unit for slidably retaining a wire electrode above a subject to be machined;

a wire guide lower unit for slidably retaining the wire electrode below the subject;

an arm member for retaining the wire guide lower unit in a position opposite to the wire guide upper unit;

a machining tank filled with a machining solution in which the subject is immersed and defining a long hole through which the arm member can pass and move; and a sealing unit for suppressing outflow of the machining solution from the long hole formed in the machining tank, wherein the sealing unit is constituted by a sealing plate and a packing, the sealing plate for blocking the long hole of the machining tank;

wherein a groove is formed along an outer periphery of the long hole;

wherein the wire electric discharge machining apparatus further comprises a machining solution jetting unit having nozzles for jetting the machining solution into the groove, the machine solution jetting unit for jetting the machining solution into a small gap formed between a peripheral portion of the long hole and the sealing plate, wherein a filtration unit for the machining solution jetted from the machining solution jetting unit is provided in a circuit of the machining solution.

* * * * *